United States Patent Office 2,996,406
Patented Aug. 15, 1961

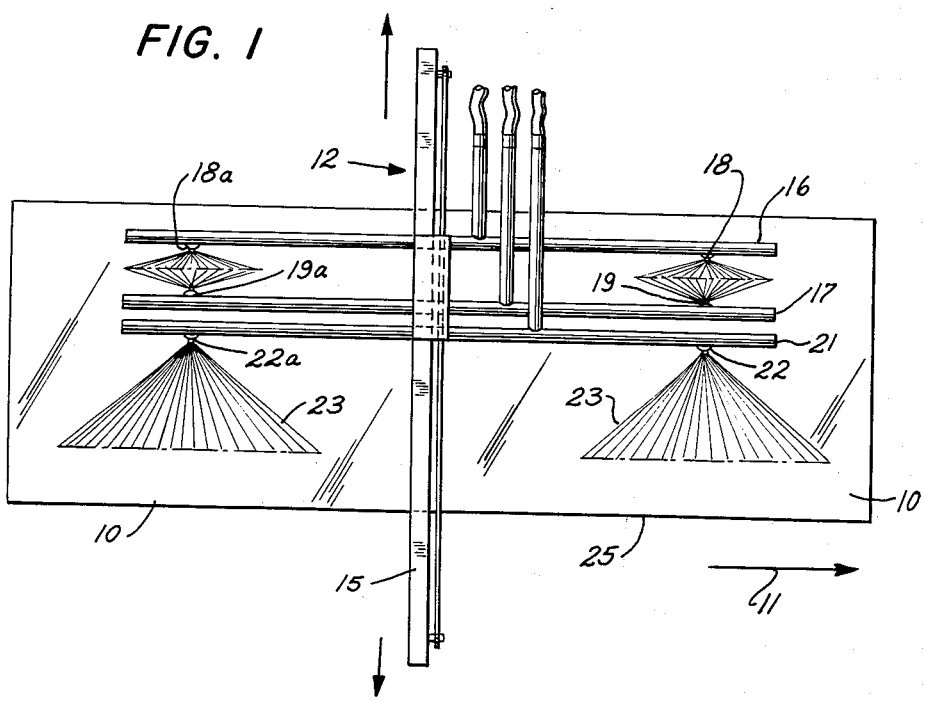
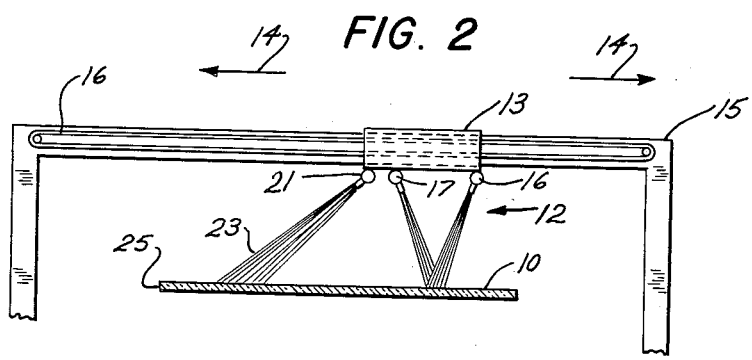

2,996,406
METHOD OF SPRAY SILVERING
Arthur R. Weinrich, Greensboro, N.C., assignor to Kay Chemicals, Inc., Dallas, Tex., a corporation of Texas
Filed May 14, 1959, Ser. No. 813,256
9 Claims. (Cl. 117—35)

This invention relates to methods of producing reflective coatings on substantially flat surfaces and, more particularly, to the production of silver mirrors by the so-called spray method involving the spraying of a silver salt, usually silver nitrate, and a reducing solution on a glass or other supporting surface.

Spray silvering, as most generally practiced today, involves applying to the relatively flat surface to be silvered, while in a substantially horizontal position, a spray or atomized solution, or mixture of solutions until a sufficient thickness of silver deposit is built up. The amount of silver thus applied, when the end product is a glass mirror, generally is of the order of .08 to .20 gram of silver per square foot of glass surface.

Most of the mirrors manufactured commercially are made in equipment which has been mechanized to minimize handling with consequent labor savings. Conventional procedure is to move the glass in a horizontal position longitudinally on a conveyor while the silvering solution is sprayed on its surface from a pair of guns (with the members of the pair spaced opposite each other in a direction transverse to the direction of movement of the conveyor) or a plurality of such pairs of guns, the pairs being spaced longitudinally along the conveyor. The spray guns are reciprocated transversely of the direction of movement of the conveyor. The fan pattern of the spray is parallel to the direction of glass travel, and the rate of reciprocation of the guns relative to the rate of forward movement of the glass is such that each area of the glass is subjected to the spray of any one pair of guns several times, thus producing a multiplicity of silver layers on the glass.

In such spray methods, only a small percentage of the total available silver in solution is deposited on the surface in the form of a reflective layer, with consequent inefficient silver deposit. Most of the silver is thrown out of solution in the form of silver sludge which remains on the glass until the glass has passed out of the silvering area of the conveyor and the sludge is rinsed off. This silver sludge is usually recovered and reclaimed. Because of losses in recovery and because of refining charges, only a portion of the value of the silver in the sludge is realized.

Such inefficiency of silver deposit is due chiefly to the spent solution remaining on the surface, as the surface is continuously sprayed with reactive silver solution, forming a barrier to the fresh sprayed solution, which barrier effectively prevents intimate contact of the fresh sprayed solution with the surface to be coated and thereby reduces the amount of nascently available metallic silver which can deposit on the surface as a metallic reflective layer.

Another disadvantage of prior spray silvering techniques is that some of the silver sludge is trapped in the metallic reflective layer, as it is formed, causing the formation of a less dense silver deposit than is desirable.

If it is attempted to blast through this sludge barrier by spraying the fresh reactive solution under relatively high pressure, much of the silver is lost by rebound from the surface and much of the remaining reactive solution is pushed aside to form a relatively thick sludge, rather than producing the desired thin uniform thickness silver depositing layer of solution on the glass.

It is among the objects of the present invention to provide a spray method, particularly adapted to the production of silver mirrors and other metallic reflective surfaces, involving multiple application of solutions with the first application in intimate contact with the surface to be silvered and with each succeeding application in intimate contact with a layer formed by the preceding application and with substantially complete removal of the spent solution between successive applications.

It is another object of this invention to provide a method of spray silvering by successive applications of silvering solution whereby each individual application is substantially fully reacted with maximum deposition of its silver before removal and replacement by another application of fresh reactive solution.

Still another object of this invention is to provide a method of silvering mirrors whereby a maximum amount of the silver in solution is deposited as an effective reflective layer and a minimum amount of sludge is formed.

Another object of this invention is to provide a process of spraying silver on a support which results in a silver film of dense character, in which the amount of entrapped silver sludge is minimized, if not completely eliminated.

Other objects and advantages of this invention will be apparent from the description thereof.

In accordance with the present invention, silver depositing solution is sprayed onto the horizontal supporting surface while the latter moves in a longitudinal direction, and the spray or sprays move transversely at relative rates such as to produce a plurality of applications of silvering solution to each unit area of the supporting surface, and a spray of water is projected onto the supporting surface in advance of the spray of silver-forming solution to effect removal of spent silver solution and sludge so that the silver-forming solution is applied in successive applications to the supporting surface preconditioned by the water spray. The silver thus builds up in successive layers, forming a unitary dense film or layer in which the amount of entrapped silver sludge is minimized, if not completely eliminated.

I have found that as the silver depositing solution is sprayed onto a surface, only the portion of thickness of the silvering solution layer closest to the surface provides the silver which deposits on a metallic reflective layer. As the molecules of silver are made available by reaction, those farther and farther up in the body of solution and away from the surface to be silvered are less and less likely to reach the surface and deposit in reflective form, and are more and more likely to enter and become part of the silver sludge. Accordingly, when a given amount of solution is used to provide a reflective film on a given area of surface, far greater efficiency of deposit is secured by applying this solution as a plurality of thin solution layers with substantial removal of the spent solution between successive solution applications rather than as one heavy solution layer. This is true whether such latter layer is formed by successive applications of the silvering solution to a given surface, or by a single application. The above explanation is advanced to facilitate a better understanding of this invention. It will be appreciated that this invention is not to be limited to or by this explanation.

In the accompanying drawing, forming a part of this specification and showing, for purposes of exemplification, a preferred arrangement of equipment for practicing the process of this invention:

FIGURE 1 is a plan view of one form of apparatus for spray silvering in accordance with the process of this invention; and FIGURE 2 is a fragmentary transverse elevation.

Referring to the drawings, the glass 10 to be silvered is carried on a conveyor (not shown) in a substantially horizontal plane or position, which conveyor moves the glass in the direction indicated by the arrow 11. The glass may be suitably dimensioned, depending on the dimensons of the mirrors to be produced therefrom. Successive sheets of glass are moved by the conveyor under the spray mechanism 12.

Spray mechanism 12 comprises a supporting frame 13 movable back and forth as indicated by arrows 14 above glass 10 in a direction transverse to the direction of movement of glass 10. Supporting frame 13, for example, may be a U-shaped frame for slidable movement on a cross bar 15 of the machine. In the embodiment shown on the drawing, frame 13, while guided by cross bar 15, is moved back and forth by an endless belt or chain 16 suitably driven for this purpose; supporting frame 13 may, of course, be reciprocated by other known mechanism for effecting reciprocatory motion.

In the embodiment of the invention shown in the drawing, the spray mechanism 12 comprises a pair of conduits 16 and 17. Conduit 16 has at spaced points along its length, spray jets or nozzles 18 and 18a. Conduit 17 has spray nozzles 19 and 19a with nozzles 19 disposed directly opposite nozzle 18 and 19a opposite nozzle 18a as shown in FIGURE 1, forming the pairs 18, 19 and 18a, 19a. While in the embodiment shown, two such pairs of nozzles are provided on the conduits 16 and 17, it will be understood that only one such pair or three or more such pairs nozzles may be disposed in spaced relation along the length of the conduits 16 and 17.

One of the conduits 16 and 17 supplies reducing solution and the other conduit silver salt solution; the mixture thus produced constitutes the metal depositing solution. It will be noted the nozzles of each pair 18, 19 and 18a, 19a are directed towards each other to form a fan spray which meets at the point of contact with the glass 10 as shown in the drawing.

A third conduit 21 is carried by the frame 13 and has nozzles 22 and 22a which are positioned in line with and in front of (during the forward stroke) the nozzles 19 and 19a respectively, carried by the conduit 17. Thus each pair of nozzles which discharge metal-forming solution has disposed in advance thereof in one direction of movement, which, for convenience, will be termed the forward stroke, a nozzle 22 for spraying water onto the glass. The spray formed by nozzles 22 extends at an angle to the horizontal surface of glass 10 of from 15° to 45°, preferably about 30°.

In operation, the nozzles 19 and 19a are supplied with a silver salt solution such, for example, as a solution containing from 0.2% to 0.8% silver nitrate, from 0.4% to 1.6% ammonium hydroxide and from 0.125% to 0.5% sodium hydroxide. The nozzles 18 and 18a are supplied with a solution of a suitable reducing agent such, for example, as a solution containing from 0.2% to 1.2% dextrose and 0.005% to 0.03% formaldehyde. The rest of the solutions in both cases are water. The percentages are on a weight basis. The supply of these solutions to the conduits 16 and 17 takes place only while the spray mechanism moves in one direction across the width of the glass, i.e., makes its forward stroke. No flow of these solutions to the conduits 16 and 17 takes place during the return stroke.

Concurrently, distilled or deionized water is supplied to the conduit 21 and sprayed by the nozzles 22 and 22a, forming a fan spray directly in front or in advance of the metal depositing solution produced by the intermingling of the sprays discharged by each pair of nozzles 18, 19 and 18a, 19a. The rate of water spray is preferably two or more times the deposition of silvering solution, e.g., 2 to 4 times as much water is sprayed on the glass during the forward stroke as silver depositing solution.

When the silvering is commenced, excess water is removed from the glass by the angular water spray discharged through the leading nozzle 22 and 22a. This water is applied to the glass in the rinsing thereof preparatory to conditioning it for silvering. This action takes place during the first stroke. During subsequent strokes, as the spray mechanism 12 is reciprocated, the water projected from the nozzles 22 and 22a effects removal of spent silver solution and sludge; the action of the water sprays in advance of the metal depositing solution sprays is to cause the spent silver solution and sludge to move towards the marginal edge 25 of the glass, which edge extends in a direction parallel to the direction of movement of the glass, and be removed from the glass. Thus the metal depositing solution is sprayed onto surfaces from which spent solution and sludge have been removed by the water sprays 23 produced by the nozzles 22 and 22a.

The rate of reciprocation of the supporting frame 13 relative to the rate of the movement of the glass is such that the frame 13 makes a plurality of movements, say from 8 to 14 strokes, back and forth during forward movement of the glass a unit distance. For example, during movement of the glass a distance of one foot, each pair of sprays may make from 8 to 14 back and forth strokes, thus applying from 8 to 14 applications of metal depositing solution on each square foot of surface.

The silver salt solution and the reducer solution are sprayed with just sufficient pressure to effect intimate comingling of the droplets of the two solutions and to form a relatively uniform thickness solution layer on the glass. The pressure should not be such as to cause marked rebound or blast effect from the glass; pressures of the order of 25 to 50 pounds per square inch, preferably about 30 to 40, give good results.

At the end of each forward stroke of the spray mechanism 12, the flow of the water to conduit 21 and of the metal depositing solutions to conduits 16 and 17 are interrupted or cut off. This may be effected by suitable valve mechanism (not shown) which may be operated either manually or automatically, as desired. The valves controlling flow through the water conduit 21 as well as those controlling the flow of metal depositing solution through conduits 16 and 17 remain closed during the return strokes. At the start of the next forward stroke, the valves are opened to supply water to conduit 21 and metal depositing solutions to conduits 16 and 17 to repeat the spray operations hereinabove described.

The interruption of the supply of flush-off water to the glass and of the metal depositing solutions to the glass, after completion of the forward stroke and the time interval during the return stroke when no water or metal depositing solution is applied to the glass, gives the applied solution time to react and deposit its silver in a thin layer or film before being flushed off or replenished with fresh reactive solutions.

For best results, the rate of reciprocation of the spray carrier 13 should be such that the time for each complete cycle, i.e., from the start of one forward stroke to the start of the next forward stroke, will be long enough to permit substantially complete reaction of the silver and reducer solution and a maximuum deposit of the silver content. This time interval will vary with the reactivity rate of the solution, which is dependent on the glass temperature, the solution temperature and the particular solutions used, i.e., the solution formulations. An average time interval for each complete cycle of from 4 to 6 seconds in practice has been found to give excellent results; the invention, however, is not limited to this time cycle. The optimum cycle for any metal depositing solution used applied at any desired temperature can readily be determined by a few trial experiments.

The following example is illustrative of a preferred embodiment of the invention. It will be appreciated that the invention is not limited to this example, but the example is given to exemplify the best mode of carrying out the invention. In the example, all percentages are on a weight basis. The example is carried out in equipment of the type shown in the drawings.

Glass was fed in a horizontal plane at a temperature of 100° F. A silver nitrate solution containing 0.6% silver nitrate, 1.20% ammonium hydroxide and 0.4% sodium hydroxide, the rest water, was sprayed at a rate of 8.5 cc. per square foot of glass surface. A like quantity of reducing solution was sprayed at the same rate at the same time to form intersecting sprays just above and in contact with the glass surface; this reducing solution contained 1% dextrose and 0.02% formaldehyde. Deionized water was sprayed concurrently during each forward stroke of the spraying mechanism at the rate of 60 cc. per square foot of surface and a pressure of 40 pounds per square inch. The rate of reciprocation was 2½ seconds forward stroke and 2½ seconds return stroke. Thus, for 2½ seconds, water and metal depositing solution including reducing solution was sprayed onto the glass, and the next 2½ seconds this spraying of the glass was discontinued. The rate of movement of the glass was approximately one foot per minute; each area of the glass was thus sprayed 12 times.

The total solution consumption was 204 cc. per square foot of surface sprayed in 12 separate applications of 17 cc. per square foot, each with substantially complete removal of the spent solution immediately ahead of each successive solution application by the spray of deionized water sprayed at the rate of 60 cc. per square foot of surface and a pressure of 40 pounds per square inch. A dense silver deposit of high brilliance was secured. The amount of silver deposit was 0.11 gram per square foot.

While there is described above and shown in the drawing separate nozzles for the silver solution and reducer solution, the invention is not limited to this mode of applying the metal depositing solution, but includes techniques involving a single nozzle or a plurality of spaced nozzles, each used for applying the metal depositing solution consisting of a mixture of metal salt solution and reducer solution.

Moreover, while the invention has been described in connection with the application of silver reflective layers and particularly the production of glass mirrors, the invention is not limited thereto but includes the deposition of other metals, e.g., copper on supporting surfaces to form uniform dense layers.

Instead of the sugar reducing solutions, other reducing solutions such as glyoxal and hydrazine types can be used.

While pure water is preferred for the flushing ahead of each successive metal solution application, other inert liquids or inert gases such as air, nitrogen or carbon dioxide can be sprayed in the same manner. The term flushing fluid is used to include such liquids and gases.

Since certain changes may be made in the above described process of spray silvering which embody this invention, without departing from the scope of this invention, it is intended that all matter contained in the above description or shown in the accompanying drawings shall be interpreted as illustrative and not in a limiting sense.

What is claimed is:

1. The process of producing a metallic layer on a support which comprises moving said support while maintained in a horizontal position, moving transverse to the direction of movement of said support in one direction across said support a spray of a flushing fluid to project said flushing fluid onto said support and a spray of metal depositing solution which is projected onto the area contacted by said fluid immediately following the contact of said area by said fluid, thus forming a thin metal layer on said support covered by spent solution, repeating the last mentioned step at least once for said metal depositing solution to form a plurality of layers of metal on each unit area of said support, and effecting the removal of said spent solution with said flushing fluid before the said repeating of the spraying of said metal depositing solution.

2. The process of producing a metallic reflective layer on a support which comprises moving said support while maintained in a horizontal position, moving transversely to the direction of movement of said support back and forth across the width of said support a spray nozzle for spraying metal depositing solution and a spray nozzle for spraying water in a series of transverse passes, feeding metal depositing solution and water, respectively, to said nozzles during movement in one direction only across the width of said support and interrupting said feed of metal depositing solution and water during the return movement of said spray nozzles during said series of passes, said metal depositing solution forming a metal deposit on said support and producing spent solution, and said water being projected in a direction to remove the spent solution formed from the preceding pass of said metal depositing solution so that the spray of metal depositing solution is projected onto the area from which the spent solution has been removed by the water spray, said water spray and spray of metal depositing solution being moved back and forth across said support at a rate to deposit a plurality of layers of metal on each unit area of said support.

3. The process as defined in claim 2, in which the spray of water is projected onto said support at an angle of 15° to 45° with respect to the plane of the surface of said support.

4. The process of producing a metallic reflective layer on a support which comprises moving said support while maintained in a horizontal position, moving transversely to the direction of movement of said support back and forth across the width of said support a spray nozzle for spraying metal depositing solution and a spray nozzle for spraying a flushing fluid for effecting removal of spent metal depositing solution in a series of transverse passes, feeding metal depositing solution and said fluid, respectively, to said nozzles during movement in one direction only across the width of said support and interrupting said feed of metal depositing solution and flushing fluid during the return movement of said spray nozzles in a series of transverse passes, said metal depositing solution forming a metal deposit on said support and producing spent solution, and said fluid being projected in a direction to remove the spent solution formed from the preceding pass of said metal depositing solution so that the spray of metal depositing solution is projected onto the area from which the spent solution has been removed by the spray of said fluid, said fluid spray and spray of metal depositing solution being moved back and forth across said support at a rate to deposit a plurality of layers of metal on each unit area of said support.

5. The process of producing a metallic reflective layer on a support which comprises moving said support while maintained in a horizontal position, reciprocating at least one spray of metal depositing solution above and back and forth in a direction transverse to the direction of movement of said support at a rate to form a plurality of successive spray applications on said support covering each unit area thereof, each spray application forming a metal deposit on said support and producing spent metal depositing solution, and projecting a spray of water onto said support before each succeeding application of metal depositing solution to remove spent metal depositing solution formed from a preceding application by causing the spent solution to flush off the edge of said support extending in the same general direction as the direction of movement of said support in advance of the succeeding application of the metal depositing solution.

6. The process of producing a silver reflective layer on glass which comprises moving successive sheets of glass, each maintained in a horizontal position, moving in a series of transverse passes at least one spray nozzle for silver depositing solution above the glass at a rate to form a plurality of successive films of silver on the glass covering each unit area thereof, simultaneously moving in a series of transverse passes over the glass at least one water spray nozzle, feeding water to said water spray nozzle and silver depositing solution to said spray nozzle for said solution during their movement in one direction only across said glass to project a spray of water onto the glass in advance of each spray of silver depositing solution to remove spent silver solution and sludge by causing the same to flush off the edge of the glass extending generally parallel to the direction of movement of the glass, and interrupting the feed of silver depositing solution and water to said sprays during their return movement across the width of the glass.

7. The process of producing a silver reflective layer on glass which comprises moving successive sheets of glass, each maintained in a horizontal plane, reciprocating a plurality of pairs of spray nozzles above and back and forth in a direction transverse to the direction of movement of the glass, said pairs of nozzles being arranged in a direction parallel to the direction of movement of said glass with the nozzles of each pair disposed in a direction transverse to the direction of movement of the glass, feeding a silver salt solution to one spray nozzle of each pair during its travel in one direction only across the glass, concurrently feeding a reducing solution to the other spray nozzle of each pair while said nozzle moves in said one direction, simultaneously moving in said one direction in advance of each of said pairs of nozzles a water spray nozzle, feeding water to each of said water spray nozzles during their movement in said one direction only across said glass to project a spray of water onto the glass in advance of each of said pairs of sprays of silver salt solution and of said reducing solution to remove spent silver solution and sludge formed from each such pair of sprays of silver salt solution and reducing solution prior to the projection of a succeeding pair of sprays of silver salt solution and reducing solution by causing the same to flush off the edge of the glass extending parallel to the direction of movement of the glass, interrupting the feed of silver salt solution, reducing solution and water to said sprays during their return movement across the width of the glass, and moving said sprays at a rate to deposit a plurality of layers of silver on each unit area of the glass per pass of the glass under said sprays with the sludge and spent solution removed from each layer prior to the deposition of a succeeding layer.

8. The process as defined in claim 6 in which the water sprays project a spray of water at an angle of 15° to 45° to the plane of the surface of said glass.

9. The process of producing a metallic layer on a support which comprises moving said support while maintained in a horizontal position, moving transverse to the direction of movement of said support across said support a spray of metal depositing solution, thus forming a thin metal layer on said support covered by spent solution, repeating the last mentioned step at least once to form a plurality of layers of metal on each unit area of said support, and effecting removal of said spent solution with a spray of flushing fluid before each repetition of the spraying of said metal depositing solution.

References Cited in the file of this patent
UNITED STATES PATENTS

| | | |
|---|---|---|
| 2,445,253 | Ver Hoek et al. | July 13, 1948 |
| 2,598,391 | Jones | May 27, 1952 |
| 2,815,298 | Heffley | Dec. 3, 1957 |

Disclaimer 2,996,406.—*Arthur R. Weinrich*, Greensboro, N.C. METHOD OF SPRAY SILVERING. Patent dated Aug. 15, 1961. Disclaimer filed Dec 17, 1962, by the inventor; the assignee, *Kay Chemicals, Inc.*, consenting.

Hereby enters this disclaimer to claims 1 and 9 of said patent.

[*Official Gazette February 19, 1963.*]